US010697436B2

(12) United States Patent
Baun et al.

(10) Patent No.: US 10,697,436 B2
(45) Date of Patent: Jun. 30, 2020

(54) WIND POWER PLANTS AND MULTI-ROTOR WIND TURBINE SYSTEMS

(71) Applicant: Vestas Wind Systems A/S, Aarhus N. (DK)

(72) Inventors: Torben Ladegaard Baun, Skødstrup (DK); Henrik Kudsk, Harley J (DK); Jesper Lykkegaard Neubauer, Hornslet (DK)

(73) Assignee: Vestas Wind Systems A/S, Aarhus N. (DK)

( * ) Notice: Subject to any disclaimer, the term of this patent is extended or adjusted under 35 U.S.C. 154(b) by 91 days.

(21) Appl. No.: 15/780,290

(22) PCT Filed: Nov. 7, 2016

(86) PCT No.: PCT/DK2016/050357
§ 371 (c)(1),
(2) Date: May 31, 2018

(87) PCT Pub. No.: WO2017/108040
PCT Pub. Date: Jun. 29, 2017

(65) Prior Publication Data
US 2018/0355850 A1  Dec. 13, 2018

(30) Foreign Application Priority Data

Dec. 22, 2015 (DK) .................... 2015 70848

(51) Int. Cl.
*F03D 13/20* (2016.01)
*F03D 1/02* (2006.01)
(Continued)

(52) U.S. Cl.
CPC ............. *F03D 13/20* (2016.05); *E04H 12/20* (2013.01); *E04H 12/24* (2013.01); *F03D 1/02* (2013.01);
(Continued)

(58) Field of Classification Search
CPC . E04H 12/20; E04H 12/24; F03D 1/02; F03D 13/20
See application file for complete search history.

(56) References Cited

U.S. PATENT DOCUMENTS 4,217,501 A * 8/1980 Allison .................... F03D 13/20
290/55
4,710,100 A * 12/1987 Laing ........................ F03D 9/28
416/11
(Continued)

FOREIGN PATENT DOCUMENTS

CN     201301776 Y   9/2009
CN     102269116 A  12/2011
(Continued)

OTHER PUBLICATIONS

China National Intellectual Property Administration, First Notification of Office Action in CN Application No. 201680073884.0, dated May 13, 2019.
(Continued)

*Primary Examiner* — Christine T Cajilig
(74) *Attorney, Agent, or Firm* — Wood Herron & Evans LLP

(57) ABSTRACT

A wind power plant includes a plurality of wind turbine systems arranged in rows and columns and includes a cable support system with at least one cable. The cable is coupled to the support structure above the first wind turbine and below the second wind turbine. The cable couples directly adjacent wind turbine system together. The cable may extend the entire length of at least one row or at least one column. A wind turbine system includes a plurality of wind turbines and a support structure including a tower and support arms. The cable support system that is coupled to the wind turbine system and that is configured to transfer loads
(Continued)

on the wind turbine system to other wind turbine systems in the wind power plant.

20 Claims, 10 Drawing Sheets

(51) Int. Cl.
*E04H 12/20* (2006.01)
*E04H 12/24* (2006.01)

(52) U.S. Cl.
CPC ..... *F05B 2240/912* (2013.01); *F05B 2240/96* (2013.01); *Y02E 10/728* (2013.01)

(56) References Cited

U.S. PATENT DOCUMENTS

| | | | |
|---|---|---|---|
| 5,182,458 A | | 1/1993 | McConachy |
| 5,228,260 A | * | 7/1993 | Dziedzic ............... E04H 12/24 403/396 |
| 5,533,304 A | * | 7/1996 | Noble ................... H01Q 1/125 343/880 |
| 8,541,897 B2 | * | 9/2013 | Khoshnevis ............ F03D 13/20 290/44 |
| 2014/0103665 A1 | * | 4/2014 | Von Grunberg ........ F03D 7/048 290/55 |
| 2015/0308139 A1 | * | 10/2015 | Wagner .................. F03D 13/20 52/1 |

FOREIGN PATENT DOCUMENTS

| | | |
|---|---|---|
| CN | 104781141 A | 7/2015 |
| DE | 4236092 A1 | 4/1994 |
| DE | 2009005339 U1 | 7/2009 |
| DE | 102014100814 A1 | 3/2015 |
| EP | 0274372 A2 * | 7/1988 ............ F03D 80/70 |
| EP | 2721288 B1 | 4/2015 |
| WO | 9800639 A1 | 1/1998 |
| WO | WO-9800639 A1 * | 1/1998 |
| WO | 03069155 A1 | 8/2003 |
| WO | 2005008062 A1 | 1/2005 |
| WO | 2007009464 A1 | 1/2007 |

OTHER PUBLICATIONS

Danish Patent and Trademark Office, Search and Exam Report in PA 2015 70848, dated Jul. 5, 2016.
European Patent Office, International Search Report and Written Opinion in PCT Application Serial No. PCT/DK2016/050357, dated Feb. 7, 2017.

* cited by examiner

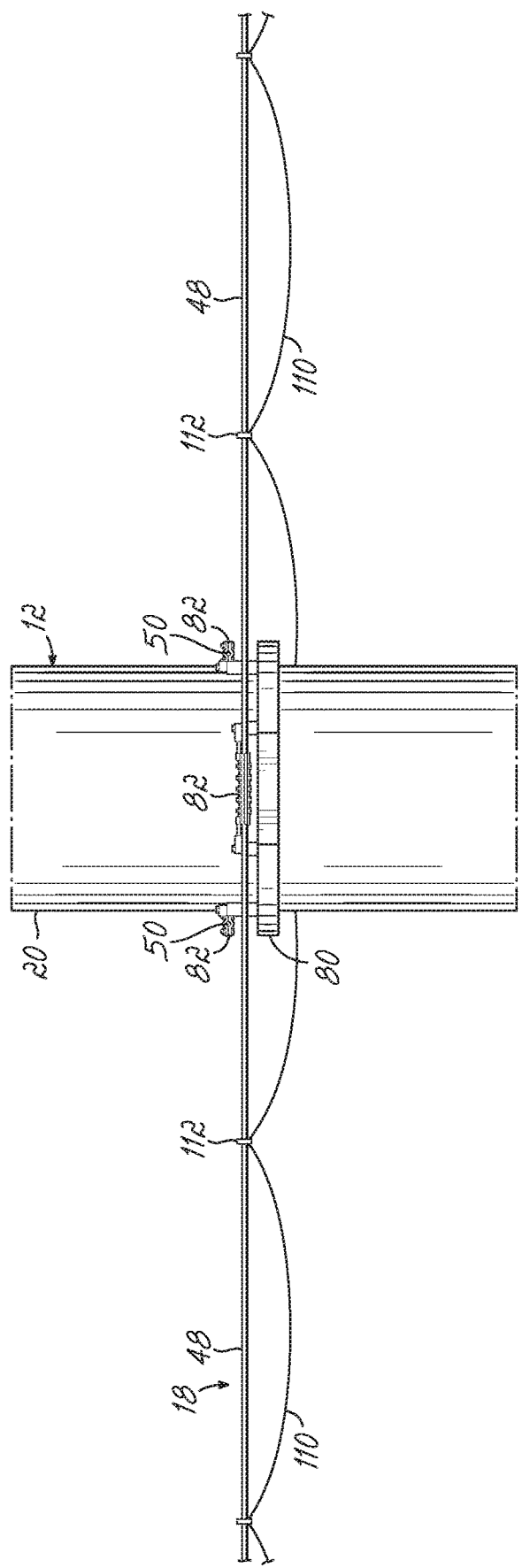

WIND POWER PLANTS AND MULTI-ROTOR WIND TURBINE SYSTEMS

TECHNICAL FIELD

The present invention relates generally to wind power plants, and more particularly to wind power plants including multi-rotor wind turbine systems.

BACKGROUND

Wind turbines are used to produce electrical energy using a renewable resource and without combusting a fossil fuel. Generally, a wind turbine converts kinetic wind energy into mechanical energy and then subsequently converts the mechanical energy into electrical energy. Wind turbines are often placed together in large groups, effectively forming wind power plants.

One common type of wind turbine is the upwind horizontal-axis wind turbine (HAWT). A HAWT includes a tower, a nacelle located at the apex of the tower, and a single turbine rotor that is supported by the nacelle. The turbine rotor is at the front of the nacelle and faces into the wind upstream of its supporting tower. The turbine rotor is coupled either directly or indirectly with a generator, which is housed inside the nacelle. The turbine rotor includes a central hub and a plurality of blades (e.g., three blades) mounted thereto and that extend radially therefrom.

The power output from any wind turbine depends on the force of the wind at the wind turbine. Generally, wind direction and velocity correlate strongly with the altitude above the earth. Higher altitudes typically equate to higher wind velocity. For example, doubling the altitude may increase wind speed by 20% to 60%. From another perspective, doubling the altitude may increase power output from a wind turbine by 34%. Thus, wind turbines that operate at higher altitudes produce comparatively more power. Yet, positioning wind turbines at higher altitudes is expensive.

To reach higher altitudes, the tower height is increased. Increasing the tower height requires an increase in the diameter of the tower to avoid buckling of the tower from the expected increase in maximum wind loading. For example, doubling the tower height may necessitate doubling the tower diameter. Doubling the tower height thus increases the amount of material by a factor of at least four. The cost of a taller tower may then be a limiting factor to elevating the wind turbine to a more optimum altitude for energy generation. Thus, there is a tradeoff between all construction costs, including the cost of the tower, and the projected power output. For HAWTs, tower heights approximately two to three times the blade length have been found to balance material costs of the tower and other components against power output.

Wind turbine design also plays a significant role in the power output from the wind at any particular altitude. In addition to the greater power from higher wind velocities, power obtained from the wind is proportional to the sweep area of the wind turbine blades. For HAWTs, sweep area is increased by using long wind turbine blades. The longer the blades, the larger the area that is traced by the blade tips. There are other wind turbine design changes that increase the sweep area.

As an alternative to HAWTs, which include a single turbine rotor, multi-rotor wind turbines incorporate multiple turbine rotors on a single support tower. Multiplying the number of rotors can effectively increase the sweep area. This amounts to simply multiplying the sweep area of one set of blades times the number of rotors (assuming all of the blades are the same length).

There are generally two types of multi-rotor wind turbines. One type is a coplanar multi-rotor wind turbine, and the other is a coaxial wind turbine. In a coplanar multi-rotor wind turbine, multiple turbine rotors are arranged in parallel with the individual wind turbine blades on each turbine rotor rotating in the same plane. This type of wind turbine may also be referred to as an array wind turbine. In a coaxial multi-rotor wind turbine, the turbine rotors are arranged in series on a single axis. That is, the wind drives a leading turbine rotor and then operates a trailing wind rotor.

In view of the multiplication of the sweep area possible with multi-rotor wind turbines, multi-rotor wind turbines offer at least the prospect of achieving much higher capacities per tower compared to single rotor wind turbines. However, multi-rotor wind turbines may also experience similar drawbacks as the HAWTs with regard to tower height. Moreover, the costs of a multi-rotor wind turbine tower may be greater still when the more complex tower system, including the weight and additional supporting equipment of multiple rotors, is taken into consideration.

Accordingly, there is a need for improved wind power plants and wind turbine systems that permit multiple wind turbines to be placed at greater altitudes while minimizing capital costs and without sacrificing the structural stability.

SUMMARY

To address these and other drawbacks, a wind power plant includes a plurality of wind turbine systems. Each wind turbine system includes multiple wind turbines, for example, a first wind turbine and a second wind turbine. The wind turbine system also includes a support structure that includes a tower. The first wind turbine and the second wind turbine are supported by the tower. The wind turbine system further includes a cable support system including a first cable that is coupled to at least two directly adjacent wind turbine systems at a coupling height that is below the first wind turbine and above the second wind turbine. The coupling height of the cable on the two directly adjacent wind turbine systems is approximately the same. The cable support system is configured to transfer loads between the wind turbine systems along the cable.

With the term "coupling height" is meant the height where the cable is coupled or attached to the support structure/tower/anchor. According to the present invention, the coupling height on two directly adjacent wind turbine systems is approximately the same. This means that there may be a direct support through the same cable from one wind turbine system to the other and vice versa, depending on in which direction support is needed. Furthermore, this facilitates the situation, where a larger number of wind turbine systems are coupled via one long cable, or multiple sectional cables connected, which extends substantially in a uni-direction way to transfer loads and support across a long line of support structures. This is as opposed to e.g. a situation where each individual support structure could have individual cable support to ground, going inclined downwards for individual supporting.

By spreading out loads over many support structures in this way, the advantages as herein described may be obtained. In particular, rapid changes in tension on the cables at any single location is distributed to the surrounding wind turbine systems that are unaffected by the initial change or surge in tension in the cables caused by the sudden, localized wind load.

In one embodiment, the cable support system couples at least one wind turbine system to at least three other directly adjacent wind turbine systems.

In one embodiment, the plurality of wind turbine systems is arranged in a plurality of rows and a plurality of columns, and the cable support system couples at least one of the rows to each of the columns. The first cable may extend the entire length of at least one row. A second cable may extend the entire length of at least one column. Yet another cable may be coupled to the two directly adjacent wind turbine systems at about the same coupling height as the first cable. The third cable may be parallel to the first cable and couple at least one wind turbine system to at least three other directly adjacent wind turbine systems.

The wind turbines each include a plurality of turbine blades each of which defines a sweep area. The cables are positioned on the tower outside of the sweep area. For example, the second wind turbine includes a plurality of turbine blades that define a sweep area. The cable is coupled to the tower above the sweep area of the first wind turbine.

In one embodiment, each of the plurality of wind turbine systems may include four wind turbines that are individually supported by four support arms. The support arms each extend outwardly from the tower. The first cable is coupled to each tower above one pair of support arms and below the other pair of support arms.

The cable support system may further include an anchor. The first cable may be coupled to the anchor at a coupling height that is below the coupling height of the first cable on the wind turbine systems. The cable support system may include a clamping mechanism that is coupled to an outer surface of each tower. The clamping mechanism may frictionally engage one or more of the cables. One cable passes through the clamping system to another clamping mechanism on the directly adjacent wind turbine system.

The cable support system may include an alternative clamping mechanism that is coupled to an inner surface of each tower. Each tower includes openings through which the cable passes. The clamping mechanism may frictionally engage the first cable. The first cable may pass through the clamping system to another clamping mechanism on the directly adjacent wind turbine system.

In another aspect of the invention, a wind turbine system includes a first wind turbine, a second wind turbine, and a support structure that includes a tower. The first wind turbine and the second wind turbine are supported by the tower. A cable support system includes a first cable coupled at a load center on the tower. The load center is below the first wind turbine and above the second wind turbine. The cable support system is configured to transfer loads on the wind turbine system along the first cable to an adjacent structure, such as another wind turbine system or an anchor. The cable support system may further include a second cable that is also coupled to the load center on the tower. The second cable may be parallel to or cross the first cable. The second wind turbine includes a plurality of turbine blades that define a sweep area. The first cable may be above the sweep area.

BRIEF DESCRIPTION OF THE DRAWINGS

The accompanying drawings, which are incorporated in and constitute a part of this specification, illustrate embodiments of the invention and together with the detailed description given below, serve to explain various aspects of the invention.

FIG. 10 is an elevation view of one embodiment of the cable support system.

DETAILED DESCRIPTION

Figure 1:
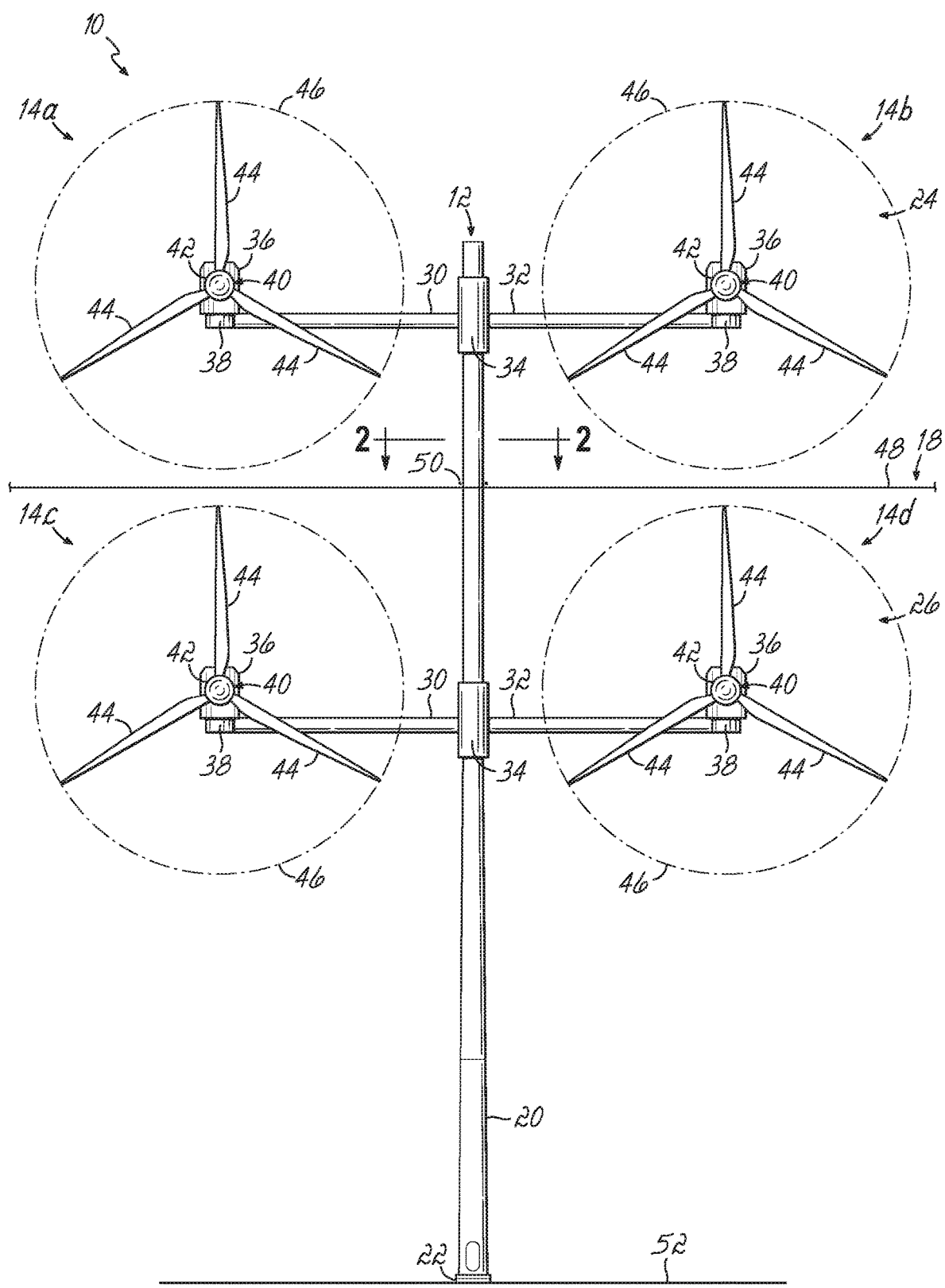
FIG. 1 is an elevation view of a multi-rotor wind turbine system according to one embodiment of the invention.
Figure 2:
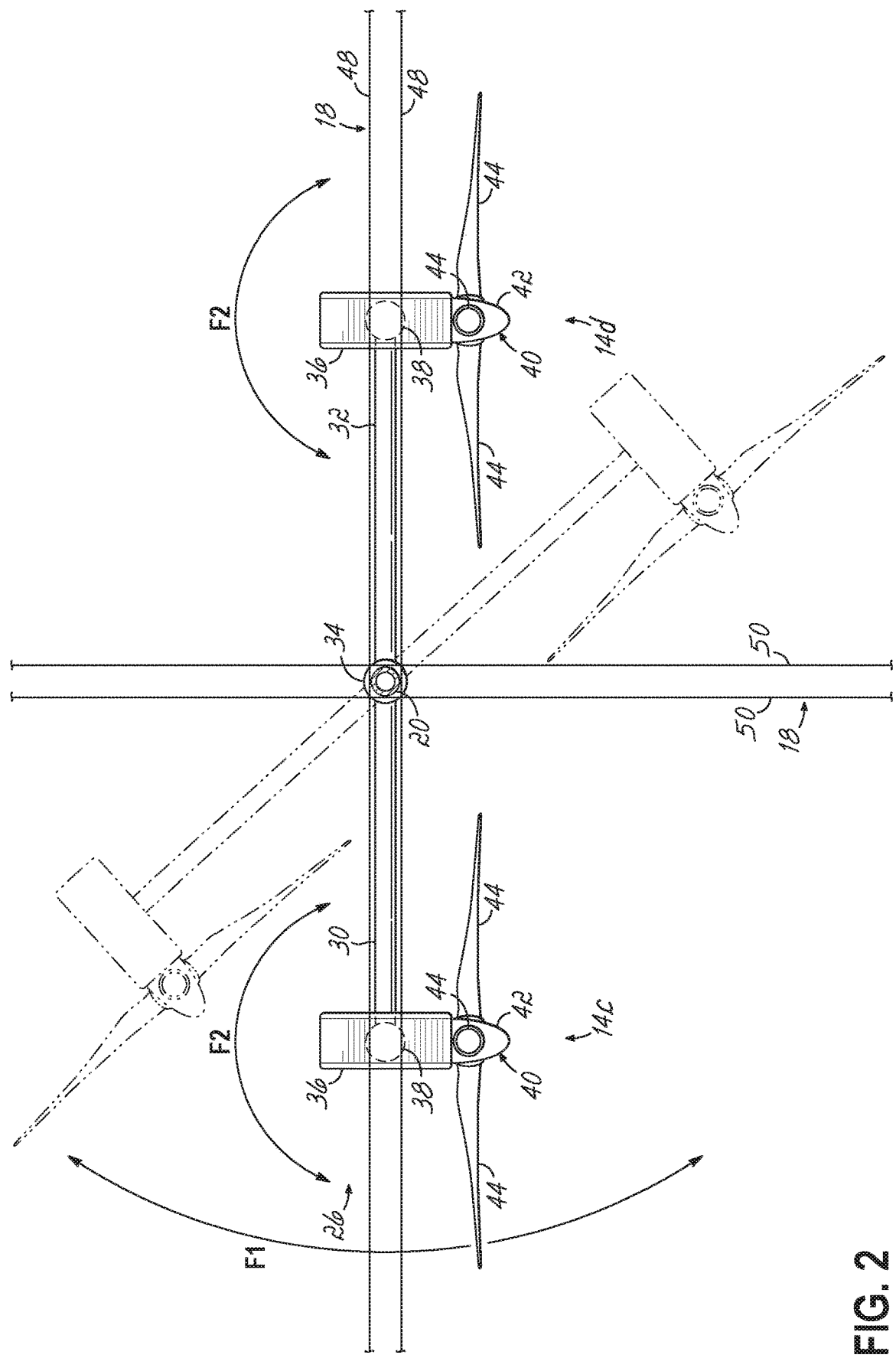
FIG. 2 is a cross-section view of the multi-rotor wind turbine system of FIG. 1 taken along section line 2-2.
Figure 3:
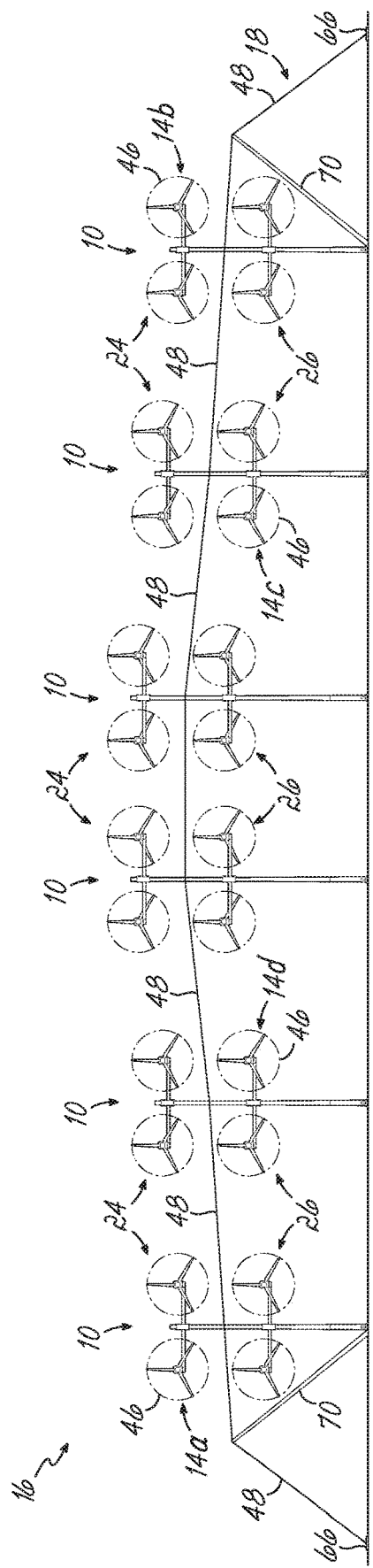
FIG. 3 is a schematic, elevation view of a wind power plant according to one embodiment of the invention.

With reference to FIGS. 1, 2, and 3, in an exemplary embodiment of the invention, a wind turbine system 10 includes a support structure 12 on which is mounted a plurality of wind turbines 14a, 14b, 14c, 14d. In that regard, the wind turbine system 10 may be referred to as a multi-rotor wind turbine, or more specifically a coplanar multi-rotor wind turbine. Multiple wind turbine systems 10 may be grouped together to form a wind power plant 16 (FIG. 3). The wind turbine systems 10 in the wind power plant 16 may be coupled to one another with a cable support system 18 (described below) to transfer loads between the individual wind turbine systems 10 during operation of the wind power plant 16.

To these and other ends, and with reference to FIG. 1, an exemplary support structure 12 may include a tower 20 that is secured to a foundation 22, as is typical with modern wind turbine systems. The foundation 22 may be a large mass, e.g., concrete or steel, embedded in the ground. Other types of foundations are also possible. The support structure 12 further includes an upper wind turbine system 24 and a lower wind turbine system 26. Each of the upper and lower wind turbine systems 24, 26 may operate independently of the other, as is described below. In the exemplary embodiment shown, the upper and lower wind turbine systems 24, 26 each include first and second arms 30, 32 that extend generally perpendicularly from a rotary mount 34 so that the upper and lower wind turbine systems 24, 26 may yaw about a vertical axis defined by the tower 20.

In one embodiment, the arms 30, 32 may be beams and/or a lattice structure and by way of example may extend outwardly from the tower 20 to at least about 20 m, to at least about 40 m, or to at least about 60 m from the tower 20 to form a cruciform-like configuration. The arms 30, 32 may be structurally supported by tension wire or tension stays (not shown).

The rotary mounts 34 rotatably couple each of the upper and the lower wind turbine systems 24, 26 to the tower 20 and may include a yaw bearing (e.g., a yaw bearing may include one fixed ring and one rotatable ring) and optional gearing for this purpose. In that regard, as is shown in FIG. 2, the upper and lower wind turbine systems 24, 26 may rotate about the tower 20 at the rotary mount 34 (as indicated by the arrow F1 and shown in phantom line).

With reference to FIGS. 1 and 2, in one embodiment of the invention, one wind turbine 14c or 14d is coupled to the end of each of the first and second arms 30, 32 in the lower wind turbine system 26. The upper wind turbine system 24 may be similarly configured, as shown (with wind turbines 14a or 14b supported at the end of each of the arms 30, 32). While four wind turbines 14a, 14b, 14c, and 14d are carried by the support structure 12, specifically at the ends of the arms 30, 32 in each of the upper wind turbine system 24 and the lower wind turbine system 26, embodiments of the present invention are not limited to the configuration of the support structure 12 as shown. Other support structure configurations are possible, for example frame-like support structures in which more than four wind turbines may be utilized. Note that the term "wind turbine" is used here in the industry-accepted sense to refer mainly to the generating components with or without converter and/or transformer of the wind turbine system and as being separate from the support structure 12.

With continued reference to FIGS. 1 and 2, in one embodiment, each wind turbine 14a, 14b, 14c, 14d includes a nacelle 36 disposed at an end of each of the first arm 30 and second arm 32 of the lower wind turbine system 26 and at each end of the arms 30 and 32 of the upper wind turbine system 24. In the embodiment shown, each nacelle 36 is movably secured to the corresponding arm 30, 32 with a yaw unit 38. The wind turbines 14a, 14b, 14c, 14d may be rotated about a vertical axis according to the yaw unit 38, as is generally indicated by the arrows F2 in FIG. 2. The degree to which the wind turbines 14a, 14b, 14c, 14d may be yawed may be determined by the relationship between the turbine 14a, 14b, 14c, 14d and the corresponding arm 30, 32 (e.g., by contact between the turbine 14a, 14b, 14c, 14d and the arm 30, 32 when the turbine 14a, 14b, 14c, 14d is rotated toward the tower). Embodiments of the present invention are not limited to those having yaw units 38 in which case the wind turbines 14a, 14b, 14c, 14d are fixed to their respective arms 30, 32 and cannot yaw in relation to each other.

A rotor 40 is operatively coupled to a generator (not shown) housed inside each nacelle 36. Each rotor 40 of the wind turbine system 10 includes a central hub 42 and a plurality of wind turbine blades 44 that project outwardly from the central hub 42 at locations circumferentially distributed around the hub 42. As shown, each rotor 40 includes three wind turbine blades 44, but the number of blades may vary from one wind turbine to another. The wind turbine blades 44 are configured to interact with air flow to produce lift that causes the rotor 40 to spin generally within a plane defined by the wind turbine blades 44. Thus, the wind turbines 14a, 14b, 14c, 14d are able to generate power from the flow of wind that passes through the swept area or rotor disc 46 (FIG. 1) associated with the rotation of the blades 44. While four wind turbines 14a, 14b, 14c, 14d are shown, embodiments of the invention are not limited to four wind turbines as more or fewer wind turbines may be carried on the support structure 12. Maximizing the total sweep area of the wind turbine system 10 (i.e., the sum of each of the individual sweep areas 46) may require at least two wind turbines on a single support structure.

With reference to FIGS. 1 and 2, in one embodiment, the cable support system 18 is operably coupled to the support structure 12 at a location above the lower wind turbine system 26, for example to the tower 20 just outside each of the sweep areas 46 of the wind turbines 14a, 14b, 14c, 14d. In this way, movement of either one or both of the upper and lower wind turbine systems 24, 26 does not bring the cable support system 18 within the sweep areas 46 of any of the wind turbines 14a, 14b, 14c, 14d.

In one embodiment, the cable support system 18 includes a cable 48 that may extend parallel to the plane of the multi-rotor array and a cable 50 that may extend along a transverse path (e.g., perpendicular) relative to the cable 48. The coupling height of the cables 48, 50 is greater than the height of the sweep area 46 of the turbine blades 44 of the lower wind turbine system 26 above the earth 52. Thus, the cables 48, 50 remain out of reach of the blades 44 through all yaw positions of the turbines 14a, 14b, 14c, 14d. As shown best in FIG. 2, there may be a pair of cables 48 in one direction and a pair of cables 50 in another direction. The pair of cables 48 may straddle the tower 20 as does the pair of cables 50. Each pair of cables 48, 50 may be coupled to the support structure 12 above the lower wind turbine system 26 by a clamping mechanism described below with reference to FIGS. 6-9.

Further in this regard and with reference to FIG. 1, each of the cables 48, 50 may be coupled to the tower 20 at an elevation substantially above the foundation 22. As shown in the representative embodiment, the cables 48 and 50 are coupled to the support structure 12 between the upper wind turbine system 24 and the lower wind turbine system 26, and in particular, may be coupled at or near the load center on the tower 20 as determined by the combined load on the tower 20 from at least the wind load on the upper wind turbine system 24 and the lower wind turbine system 26 and associated structure 12 (e.g., arms 30, 32). Alternatively, the cables 48 and 50 may be coupled to the support structure 12 at a midpoint between the upper wind turbine system 24 and the lower wind turbine system 26. By way of example only and not limitation, the cables 48, 50 may be coupled to the tower 20 at a coupling height within the top third of the tower 20 though the cable support system 18 is not coupled at the top of the tower 20. The cable support system 18 may extend between adjacent wind turbine systems 10.

Figure 4:
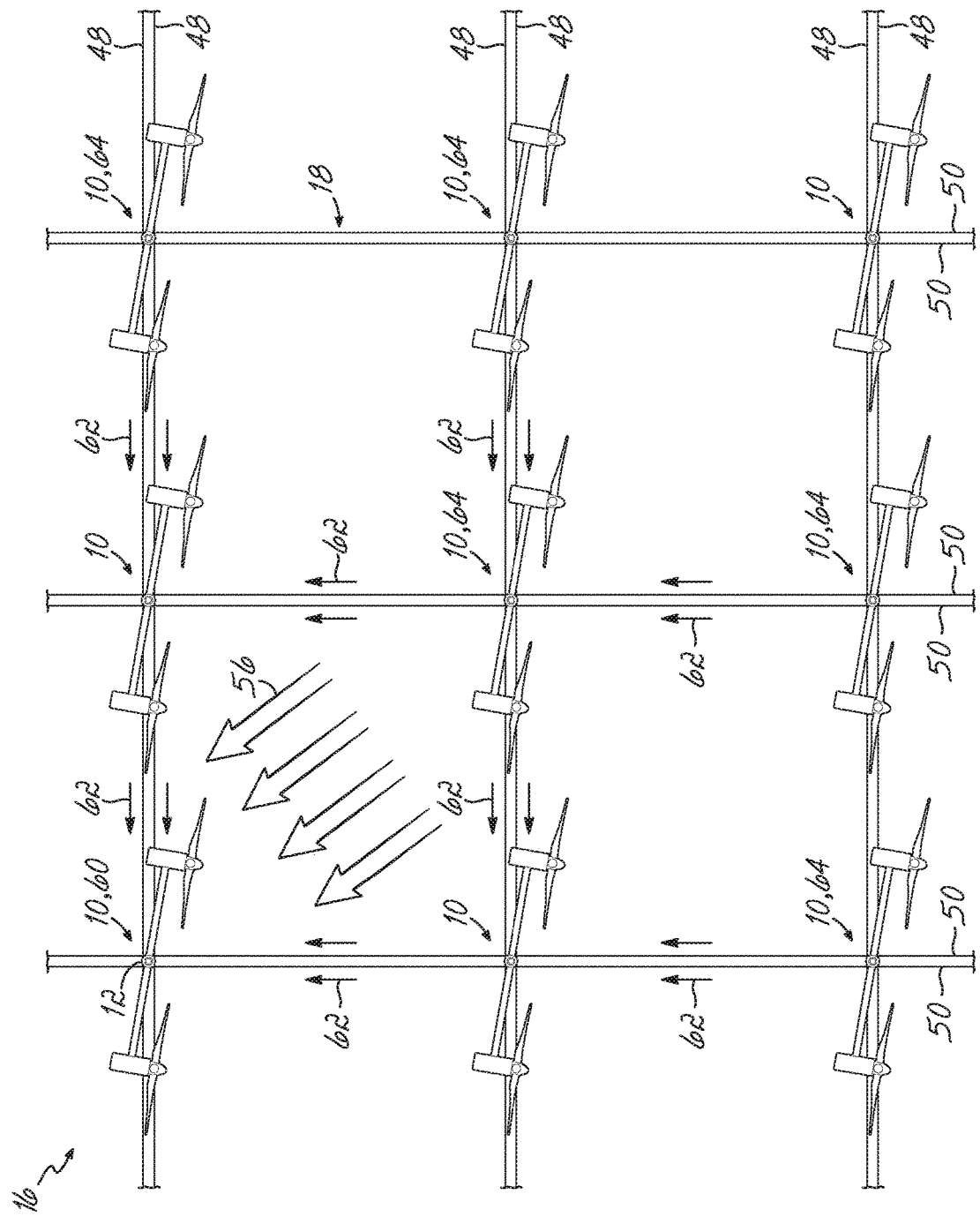
FIG. 4 is schematic plan view of a wind power plant according to embodiments of the invention.

With reference to FIGS. 3 and 4, in one embodiment, the cable support system 18 couples at least two directly adjacent wind turbine systems 10 together. In this regard, the directly adjacent wind turbine systems 10 of the wind power plant 16 support each other during operation. As shown in FIG. 4, the wind turbine systems 10 may be arranged in rows and columns with the wind turbine systems 10 defining the vertices of a regular polygon (e.g., a square). However, the arrangement of the wind turbine systems 10 is not limited to regular polygon type arrangements, as the wind turbine systems 10 may define an irregular polygon (e.g., a parallelogram or a rhombus). Embodiments of the present invention are not particularly limited to the arrangement of the wind turbine systems 10 though there may be some benefit if the shortest distance between adjacent wind turbine systems 10 is aligned (i.e., parallel) with the dominate wind direction.

Referring to FIG. 4, pairs of cables 48, 50 may extend along each row and column, respectively, of wind turbine systems 10 in the power plant 16 to mechanically connect adjacent wind turbine systems 10. Thus, the cable support system 18 forms a network of connections between wind turbine systems 10 to produce a wind power plant 16 that is self-supporting. That is, none of the wind turbine systems 10 in the plant 16 stands alone. Each wind turbine system 10 may be coupled to at least three other directly adjacent wind turbine systems 10 (e.g., at an edge of the power plant 16)

or may be coupled to at least four other directly adjacent wind turbine systems 10 (e.g., at an interior portion of the power plant 16).

In particular, this network of cables 48, 50 mechanically couples each of the wind turbine systems 10 in the power plant 16 to each other. Wind loads that perturb only a subset of the wind turbine systems 10 in the power plant 16 are spread to other, surrounding wind turbine systems 10 in the power plant 16. More specifically, rapid changes in tension on the cables 48 and/or 50 at any single location, such as a single wind turbine system 10 or a small group (i.e., a subset) of wind turbine systems 10, is distributed to the surrounding wind turbine systems 10 that are unaffected by the initial change or surge in tension in the cables 48, 50 caused by the sudden, localized wind load.

As one exemplary scenario, a wind gust as indicated by double arrows 56 in FIG. 4 may affect only a portion of the wind power plant 16. As is illustrated, the wind gust 56 may affect only a subset of the wind power plant 16, for example, the wind turbine system 10 at 60. The support structure 12 at 60 may be subject to a maximum gust wind load that is greater than the normal wind load observed by the remaining wind turbine systems 10 of the power plant 16 for example at 64. As a result, the wind gust 56 may push on the wind turbine system 10 at 60 to displace it relative to the surrounding wind turbine systems 10. Thus at 60, a localized increase in tension in the cables 48, 50 of the support system 18 may be observed. The cable support system 18 via cables 48, 50 may resist displacement of the wind turbine system 10 at 60 by distributing the surge in the load to the cables 48, 50 which is then distributed to the normally loaded wind turbine systems 10, for example at 64. This is illustrated by the arrows 62 in FIG. 4, which generally illustrate an increase in the tension on the cables 48, 50 from the wind turbine system 10 at 60 to the surrounding wind turbine systems 10 at 64.

With reference to FIG. 1, this improved mechanical support of each wind turbine system 10 at locations above one wind turbine 14c, 14d reduces the moment arm by which loads from wind gusts on the wind turbine system 10 stresses the support structure 12. In particular, the cable support system 18 may reduce loads on the tower 20 proximate the foundation 22. In the absence of the cable support system 18, the tower 20 would be cantilevered over its entire height above the earth. So, coupling the cable support system 18 to the support structure 12 of one wind turbine system 10 and to adjacent support structures 12 on adjacent wind turbine systems 10 effectively reduces the portion of each tower 20 that is cantilevered. Only the remaining portion of each of the support structures 12 above the cable support system 18 is cantilevered. Because this portion is substantially shorter than the portion of the tower cantilevered in the absence of the cable support system, a much smaller moment arm is available for wind gusts to stress the support structure 12 according to embodiments of the present invention.

Advantageously, supporting the support structure 12 at locations above the wind turbines 14c, 14d of the lower wind turbine system 26 and distributing wind gust loads on the tower 20 to other wind turbine systems 10 in the power plant 16 unaffected by the wind gust may permit all of the towers 20 in the power plant 16 to be made with less material. This reduces the cost per unit height of the tower 20 as compared to a tower that is cantilevered from its foundation in which case a tower of similar height constructed without the cable support system 18 must have a substantially larger diameter and for that reason is more expensive to construct. According to embodiments of the invention, in view of the lower cost per unit height, the tower 20 may be made taller so that the wind turbines 14a, 14b, 14c, 14d may be elevated by at least an amount proportional to the cost savings. In other words, for a given construction cost, a taller tower may be constructed in accordance with embodiments of the present invention.

With reference to FIG. 3, the wind turbine systems 10 need not be all of the same height. For example, the wind turbine systems 10 may gradually increase in height toward the center of a given row/column and then decrease in height from the center toward the opposite end of the row/column. The wind turbine systems 10 in the center of the power plant 16 may be taller than those positioned at or near the periphery of the power plant 16. For example, wind turbine systems 10 in the center of the row/column may be about 250 m tall whereas wind turbine systems 10 near or at the edge of the wind power plant 16 may be about 150 m tall. However, as shown, the cable 48 is coupled to two directly adjacent wind turbine systems 10 at the same coupling height. The cable 48 may couple to other wind turbine systems 10 in the plant 16 despite the height differences. In one embodiment, the cable 48 may couple directly adjacent wind turbine systems 10 at their respective load centers according to the wind turbines 14a, 14b, 14c, and 14d and so the cable 48 may not be parallel to the ground. Although not shown in FIG. 3, the cable 50 may be coupled to each wind turbine system 10 despite the height differences between any adjacent wind turbine systems 10 in an orientation similar to that shown for cable 48. Advantageously, because the support structures 12 may be taller, each wind turbine system 10 in the wind power plant 16 may produce more power. Collectively, the wind power plants 16 according to embodiments of the invention may produce more energy while costing the same amount or less to construct.

Figure 5:
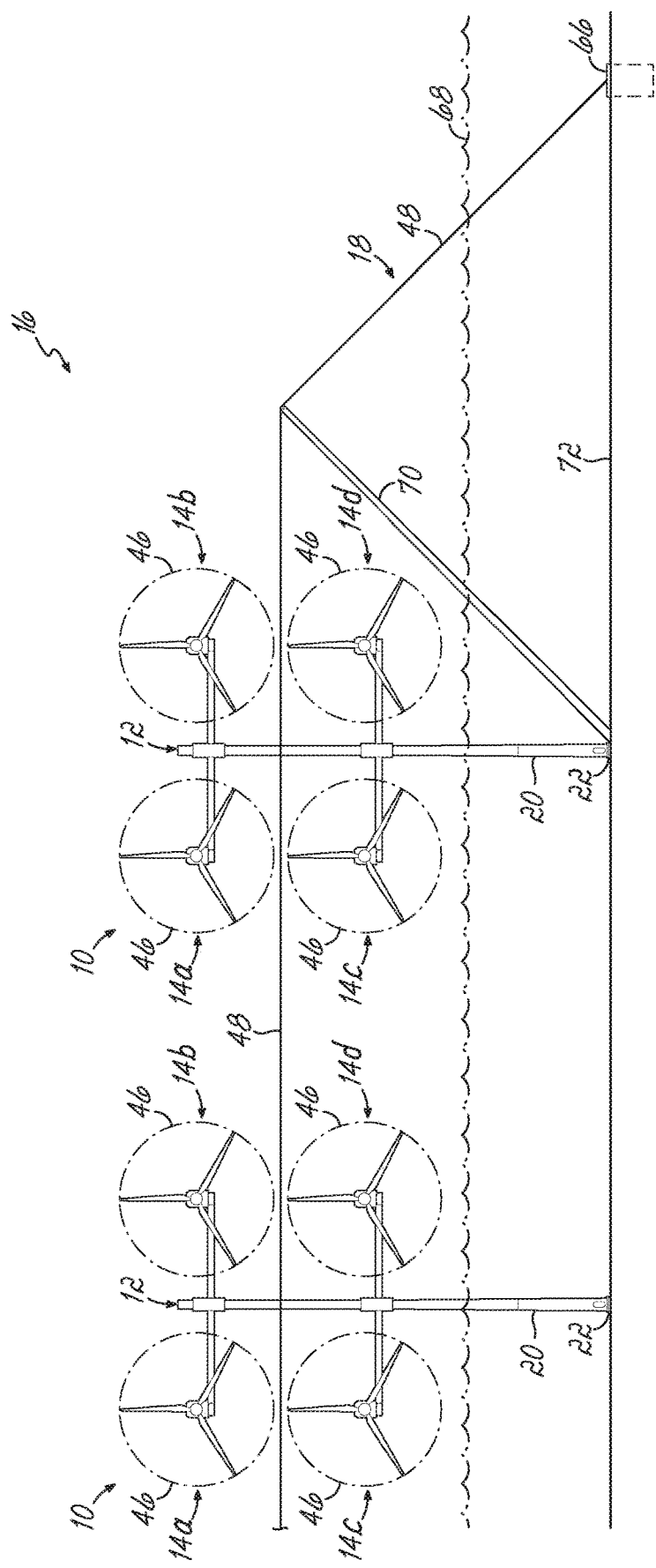
FIG. 5 is an elevation view of a part of a wind power plant according to one embodiment of the invention.

In one embodiment and with reference now to FIGS. 3 and 5, the ends of each row of wind turbine systems 10 in the wind power plant 16 may be anchored. A support member 70 may guide the cable 48, 50 outside of the sweep area 46 (and above a water level 68 for off-shore installations, for example) of the wind turbine system 10 positioned at the end of the row/column of the wind turbine system 10. While not being particularly limited to any particular configuration, the support member 70 may be a tube, a beam, or the like that may be anchored proximate the tower 20 to the sea bed 72. In the exemplary embodiment shown, the cable support system 18 may terminate with an anchor 66 attached to the cables 48, 50. The anchor 66 may be buried in or attached to the earth, such as in the seabed 72. From the anchor 66, the cables 48, 50 may be continuous along their lengths from the anchor 66 to another anchor 66 (FIG. 3) on the opposite end of the row/column of wind turbine systems 10 in the power plant 16. That is, a single cable 48 may extend from one wind turbine system 10 at one end of the power plant 16 to another wind turbine system 10 at the opposing end of the row/column of the power plant 16. The cables 48, 50 may be coupled to each of the support structures 12 of each wind turbine system 10 between the two anchors 66. Furthermore, each of the cables 48, 50 may be pre-tensioned, such as by a turnbuckle system or adjusters or by other tensioning means known in the cable tensioning art.

Figure 6:
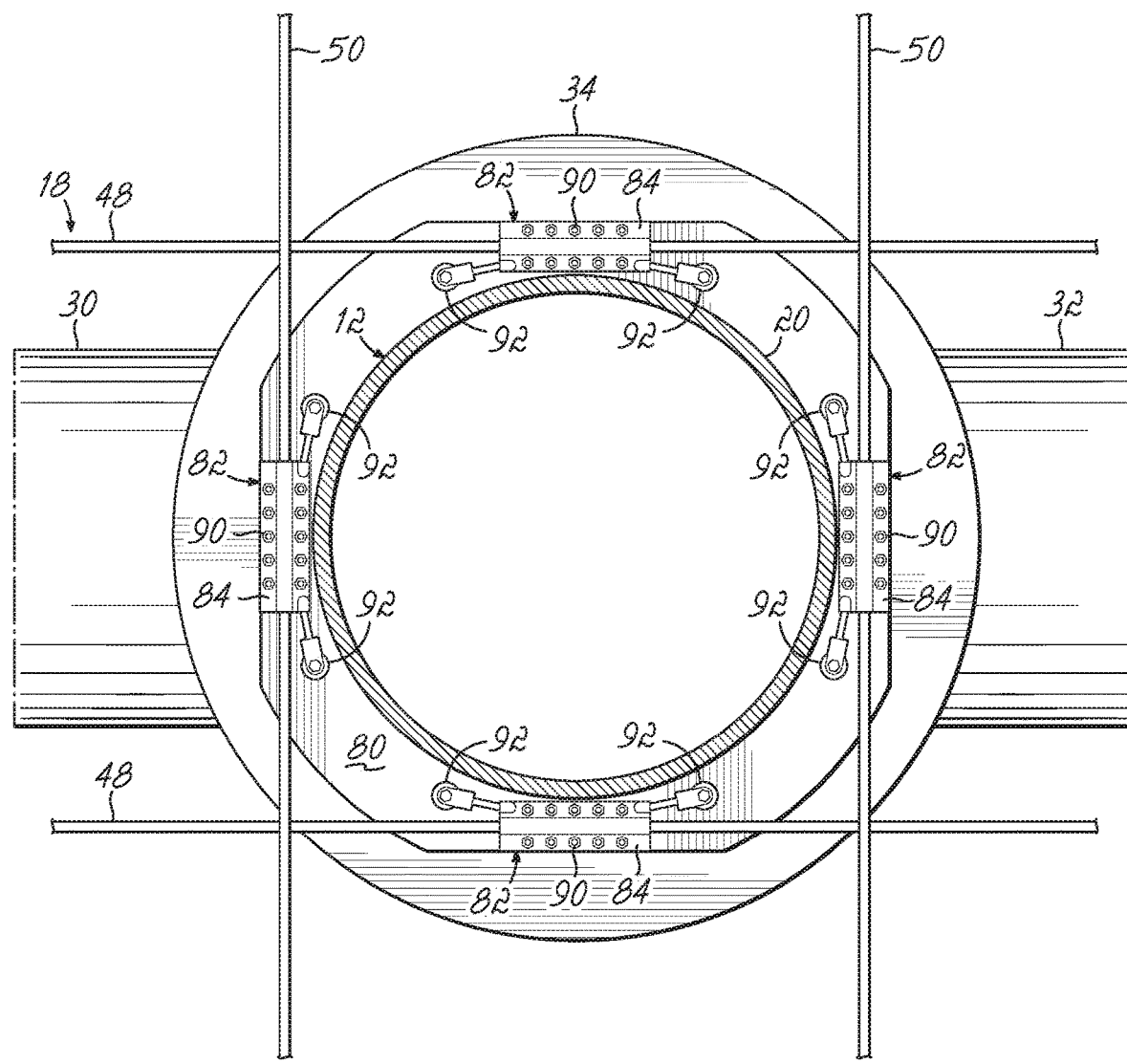
FIG. 6 is a cross-sectional view of a cable support system according to one embodiment of the invention taken along section line 2-2 of FIG. 1.
Figure 7:
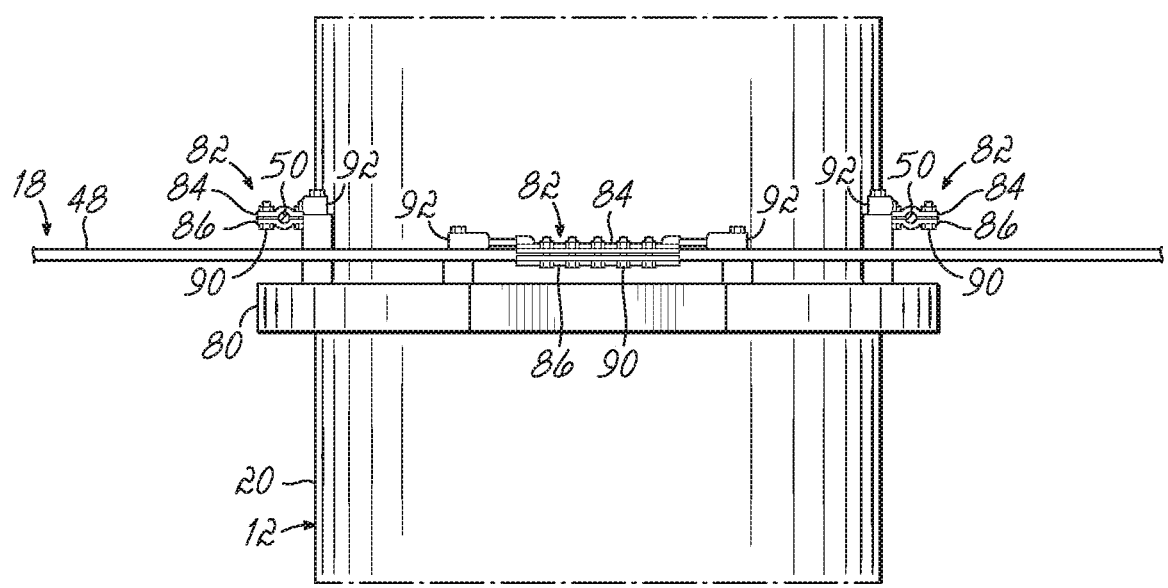
FIG. 7 is an elevation view of the cable support system shown in FIG. 6.

In that regard and with reference to FIGS. 6 and 7, in one embodiment, the cables 48, 50 may be coupled to the support structure 12 of each of the wind turbine systems 10 in the power plant 16. As shown, the pair of cables 48 may straddle the tower 20 and may be coupled to the tower 20 proximate the outside diameter of the tower 20. In one embodiment, a flange 80 may extend outwardly from the support structure 12 and, in particular, from the tower 20. Multiple clamping mechanisms 82 may be mounted on the flange 80 by which each of the cables 48 and 50 is coupled to the support structure 12. By way of example only and not limitation, the clamping mechanisms 82 may include opposing plates 84 and 86 in between which one of cables 48 and 50 is clamped by tightening a plurality of bolts 90 to clamp the opposing plates 84 and 86 onto the corresponding cable 48, 50. One or both of the plates 84 and 86 may be coupled to the flange 80 by opposing connection elements or brackets 92. In accordance with embodiments of the invention, the cables 48, 50 are continuous through each of the clamping mechanisms 82 and so the cables 48, 50 may be only frictionally coupled to the support structure 12 of each of the wind turbine systems 10 in the wind power plant 16. In addition, or alternatively, the clamping mechanisms 82, and in particular the connection elements 92, may be rigid or have built-in flexibility. While two cables 48, 50 are shown to straddle the tower 20, embodiments of the invention may include a single cable 48, 50 attached proximate the outside of the tower 20.

Figure 8:
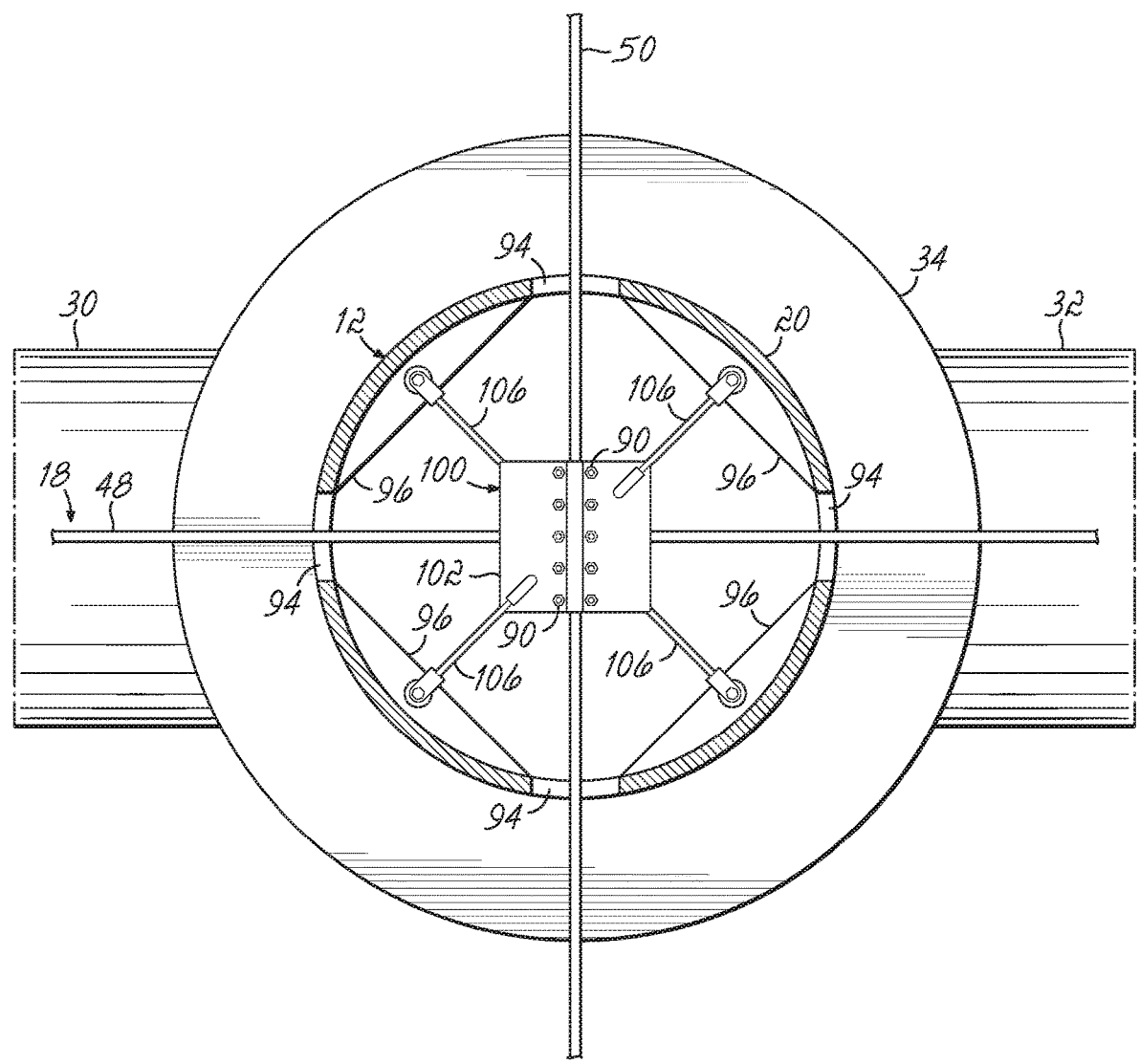
FIG. 8 is a cross-sectional view of a cable support system according to one embodiment of the invention taken along section line 2-2 of FIG. 1.
Figure 9:
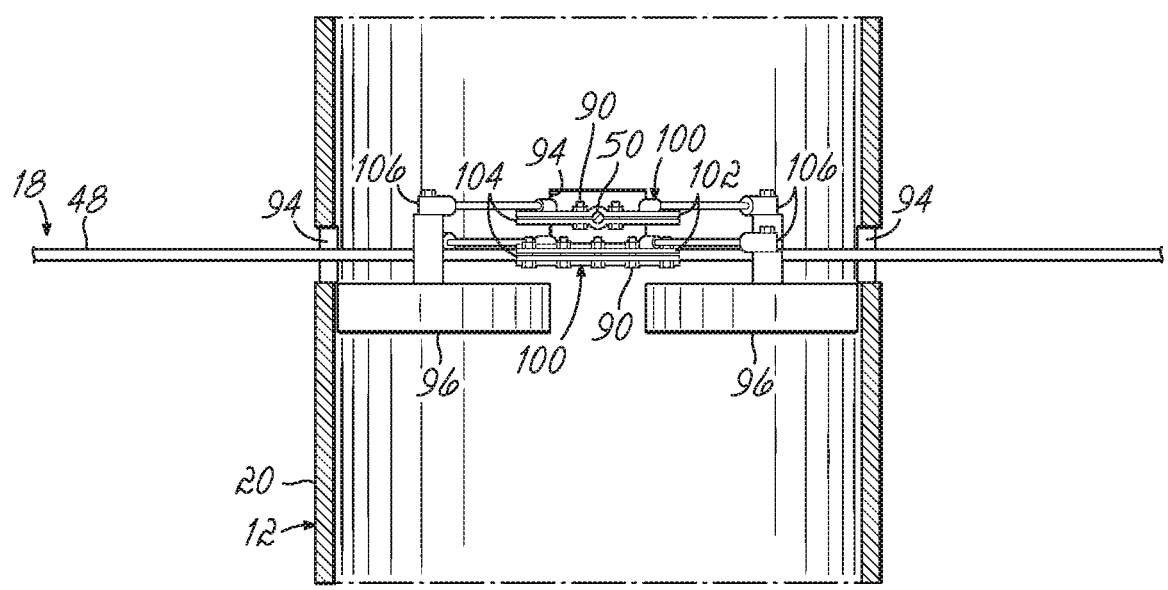
FIG. 9 is an elevation view of the cable support system shown in FIG. 8.

In one embodiment of the invention and with reference now to FIGS. 8 and 9, a single cable 48 and a single cable 50 may each be coupled to the support structure 12, and in particular to the tower 20. In this regard, the tower 20 may define openings 94 through which the corresponding cables 48, 50 may pass into the interior of the tower 20. Within the interior of the tower 20 multiple flanges 96 may extend inwardly to support multiple clamping mechanisms 100. One clamping mechanism 100 may include opposing plates 102 and 104 that are drawn together about cable 48 or 50 by bolts 90 to frictionally clamp the cable 48, 50 between the plates 102 and 104. The plates are coupled to the flanges 96 by connection elements 106. In accordance with embodiments of the invention, the cables 48, 50 are continuous through each of the clamping mechanisms 100 and so the cables 48, 50 may be only frictionally coupled to the support structure 12 of each of the wind turbine systems 10 in the wind power plant 16. In addition, or alternatively, the clamping mechanisms 100, and in particular the connection elements 106, may be rigid or have built-in flexibility.

In one embodiment of the invention, and with reference now to FIG. 10, the cable support system 18 may support other structures in addition to the wind turbine systems 10. By way of example only, and not limitation, the cables 48, 50 support one or more electrical cables 110 by hangers 112 coupled to the cables 48, 50. The electrical cables 110 may include, for example power cables or signal cables.

While the present invention has been illustrated by a description of various embodiments and while these embodiments have been described in some detail, it is not the intention of the inventor to restrict or in any way limit the scope of the appended claims to such detail. Thus, additional advantages and modifications will readily appear to those of ordinary skill in the art. The various features of the invention may be used alone or in any combination depending on the needs and preferences of the user.

What is claimed is:

1. A wind power plant, comprising:
 a plurality of wind turbine systems, each including:
  a first wind turbine;
  a second wind turbine; and
  a support structure that includes a tower, the first wind turbine and the second wind turbine being supported by the tower; and
 a cable support system including a first cable that is coupled to at least two directly adjacent wind turbine systems at a coupling height that is below the first wind turbine and above the second wind turbine on each of the adjacent wind turbine systems, the coupling height on the at least two directly adjacent wind turbine systems being approximately the same,
 wherein the cable support system is configured to transfer loads between the wind turbine systems along the first cable.

2. The wind power plant according to claim 1, wherein the cable support system couples at least one wind turbine system to at least three other directly adjacent wind turbine systems.

3. The wind power plant according to claim 1, wherein the plurality of wind turbine systems is arranged in a plurality of rows and a plurality of columns, and the cable support system couples at least one of the rows to each of the columns.

4. The wind power plant according to claim 3, wherein the first cable extends the entire length of at least one row.

5. The wind power plant according to claim 4, wherein the cable support system further includes a second cable that extends the entire length of at least one column.

6. The wind power plant according to claim 5, wherein the cable support system further includes a third cable that is coupled to the at least two directly adjacent wind turbine systems at about the same coupling height as the first cable and is parallel to the first cable.

7. The wind power plant according to claim 1, wherein the first wind turbine includes a plurality of turbine blades that define a sweep area and the first cable is coupled to the tower below the sweep area.

8. The wind power plant according to claim 1, wherein each of the plurality of wind turbine systems includes four wind turbines individually supported by four support arms each extending outwardly from the tower, and the first cable is coupled to each tower above one pair of support arms and below the other pair of support arms.

9. The wind power plant according to claim 1, wherein the cable support system further includes an anchor and the first cable is coupled to the anchor at a coupling height that is below the coupling height of the first cable on the at least two directly adjacent wind turbine systems.

10. The wind power plant according to claim 1, wherein the cable support system includes a clamping mechanism that is coupled to an outer surface of each tower, the clamping mechanism being frictionally engaged with the first cable with the first cable passing through the clamping system to another clamping mechanism on the directly adjacent wind turbine system.

11. The wind power plant according to claim 1, wherein the cable support system includes a clamping mechanism that is coupled to an inner surface of each tower, each tower including openings through which the first cable passes, the clamping mechanism being frictionally engaged with the first cable with the first cable passing through the clamping system to another clamping mechanism on the directly adjacent wind turbine system.

12. A wind power plant, comprising:
 A plurality of wind turbine systems, each wind turbine system comprising:
  a first group of wind turbines;
  a second group of wind turbines; and
  a support structure that includes a tower, wherein the first group of wind turbines is attached to the tower at a first height and the second group of wind turbines is attached to the tower at a second height, wherein only the first group of wind turbines and the second group of wind turbines are being supported by the tower; and a cable support system that includes a first cable coupled to at least two directly adjacent wind turbine systems at a coupling height on the tower, the coupling height on the at least two directly adjacent wind turbine systems being below the first height and above the second height, wherein the cable support system is configured to transfer loads on the wind turbine systems along the first cable.

13. The wind turbine system according to claim 12, wherein the cable support system further includes a second cable that is coupled to the support structure at the load center on the tower.

14. The wind turbine system according to claim 13, wherein the second cable is parallel to the first cable.

15. The wind turbine system according to claim 13, wherein the second cable crosses the first cable.

16. The wind turbine system according to claim 13, wherein the second wind turbine includes a plurality of turbine blades that define a sweep area and the first cable is above the sweep area.

17. A wind power plant, comprising:
a plurality of wind turbine systems, each including:
a first wind turbine;
a second wind turbine; and
a support structure that includes a tower, the first wind turbine and the second wind turbine being supported by the tower; and a cable support system including a first cable and a second cable that straddle the tower and are both coupled to at least two directly adjacent wind turbine systems at a coupling height that is below the first wind turbine and above the second wind turbine on each of the adjacent wind turbine systems, the coupling height on the at least two directly adjacent wind turbine systems being approximately the same, wherein the cable support system is configured to transfer loads between the wind turbine systems along the first cable and the second cable.

18. The wind power plant according to claim 17, wherein the second cable is parallel to the first cable.

19. The wind power plant according to claim 17, wherein the plurality of wind turbine systems is arranged in a plurality of rows and a plurality of columns, and the cable support system couples at least one of the rows to each of the columns.

20. The wind power plant according to claim 19, wherein the first and second cables extend the entire length of at least one row.

* * * * *